2,764,548
DINONYLNAPHTHALENE SULFONATES AND PROCESS OF PRODUCING SAME

Robert G. King and George W. Thielcke, Norwalk, Conn., assignors to King Organic Chemicals, Incorporated No Drawing. Application January 25, 1955,
Serial No. 484,078
11 Claims. (Cl. 252—33)

This invention relates to alkylated naphthalene sulfonates, and has for its object the provision of dinonylnaphthalene sulfonic acid the nonyl radicals of which are highly branched, preferably having a tertiary carbon atom, and the sodium, potassium, calcium, magnesium, barium, zinc, ammonium and amine salts thereof, and a process of producing these compounds.

The compounds of this invention are characterized by good solubility in petroleum products such as naphtha, and also in motor fuels, mineral seal oil, lubricating oils and the like, and by their insolubility in water.

The invention provides compositions of the new dinonylnaphthalene sulfonates in organic solvents, in oils such as mineral seal oil, lubricating oils including ester type oils, and in motor fuels. These compositions may contain a relatively high percentage of the dinonylnaphthalene sulfonates for use as additives to other oils and motor fuels. The compositions of the invention are very effective rust inhibitors in motor fuels and lubricating oils. The free sulfonic acid and certain salts of the sulfonic acid are very effective plasticizers, especially for rubber. Both the organic and inorganic salts of dinonylnaphthalene sulfonic acid may be used as oil additives in amounts of from 0.01% to 10% in lubricating oils. These oil products may be used together with one or more of the following—anti-oxidants, pour point depressants, and oiliness additives. The products of this invention provide improved motor fuels which allow better lubrication at the tops of the cylinders and at the valve stems of internal combustion engines.

The ammonium salts and the amine salts of dinonylnaphthalene sulfonic acid are especially effective additives for motor fuels such as gasoline or diesel fuel.

Our invention provides a very efficient process of producing the dinonylnaphthalene sulfonates in high purity and in very good yield. Dinonylnaphthalene is dissolved in an organic solvent which is substantially inert in its reaction with sulfonic acid. The solution of the dinonylnaphthalene and the solvent is treated with oleum or sulfuric acid and sulfonated to form the mono-sulfonic acid which is retained in the solvent layer. The solvent layer is substantially free of sulfuric acid and stratifies upon settling for a period of time from the spent sulfuric acid layer which is then withdrawn leaving a solution of the free sulfonic acid in the solvent layer. The solvent layer containing the dinonylnaphthalene sulfonic acid is washed with water to remove traces of sulfuric acid and a small amount of di-sulfonic acid and other impurities which may be present. The lack of water solubility permits good stratification during the settling period after which the aqueous layer may be easily withdrawn and discarded.

During or after the washing of the dinonylnaphthalene sulfonate an oil such as mineral seal oil or lubricating oil may be added as a vehicle for the sulfonic acid or its salts. The addition of the fluid lubricating oil or mineral seal oil in sufficient quantity allows the sulfonate to remain a liquid during subsequent removal of the sulfonation solvent.

The process of our invention involves the replacement of some of the hydrogen atoms on the naphthalene nucleus by highly branched nonyl groups, which is performed advantageously by alkylating the naphthalene with highly branched nonenes, for example, tripropylene with a suitable catalyst such as hydrogen fluoride or anhydrous aluminum chloride in a suitable anhydrous solvent containing in solution the naphthalene. The use of suitable solvents such as naphtha, sulfur dioxide, nitrobenzene or a mixture of benzene and nitrobenzene in the alkylation result in a high yield of dinonylnaphthalene and relative ease of recovery of the solvent.

Sufficient solvent must be used to dissolve substantially all of the naphthalene and aluminum chloride used as well as the dinonylnaphthalene produced in the reaction.

In the alkylation of naphthalene with nonene according to our invention, we aim particularly to use a raw material consisting predominantly, and if possible, substantially entirely of nonene, which is an olefin, and advantageously nonenes having a tertiary carbon atom. For commercial reasons at this time we have found it advantageous to use nonene produced by the trimerization of propylene with an acid catalyst because such products comprise a preponderance of nonene having a tertiary carbon atom and are highly branched.

Our invention also provides an improved method of forming sulfonic acids and the aforementioned salts from dinonylnaphthalene. In the process of sulfonation, we dissolve the dinonylnaphthalene in a solvent which is free of aromatics or olefins which under the condition of the reaction would disadvantageously react with sulfuric acid. Suitable solvents for dinonylnaphthalene in the sulfonation reaction are petroleum naphtha, hexane, heptane, octane and chlorinated solvents. The use of a solvent for the dinonylnaphthalene during the sulfonation reaction is necessary to maintain the reaction in the liquid state, so that the sulfuric acid and dinonylnaphthalene may be thoroughly mixed during the sulfuric acid addition. After sulfonation the presence of the solvent in sufficient quantity maintains the sulfonic acid in the liquid state and allows separation of the spent acid layer from the solvent layer containing the dinonylnaphthalene sulfonic acid by stratification after which the solvent layer may be washed with water to remove small amounts of impurities which are water soluble but insoluble in the spent sulfuric acid layer.

In a preferred practice of our invention, we introduce the sulfuric acid, preferably oleum, into the solution of dinonylnaphthalene at the desired temperature and with accompanying agitation. After the reaction has proceeded to completion, we subject the product to successive washings and stratifications in each of which the water-insoluble but oil soluble nonylnaphthalene sulfonic acid accumulates in an upper layer. At an appropriate stage in the washing and stratification, depending upon the concentration of sulfuric acid and mono- and di-sulfonic acids, we may incorporate into the product a sufficient amount of oil, which oil will be present in the final purified sulfonate and act as a vehicle or solvent for the sulfonate or sulfonic acid maintaining the final product in the fluid state. The residual acid at this state should be sufficiently low that the oil is not browned or darkened by the acid with a resulting impairment of the color of the final product. The oil employed is preferably one which will not react with the sulfonic acid layer, such as a paraffin oil, and is selected on the basis of properties which will be compatible with the ultimate use of the product. We may use, for example, a light lubricating oil when the product is to be incorporated in lubricating oils, or a mineral seal oil when the product is to be used as in the plasticizing of rubber.

The oil which is dissolved in the dinonylnaphthalene sulfonic acid gives it a desired flowing consistency and facilitates the removal of an otherwse extremely viscous, or even solid, and resin-like material from the processing equipment. The dinonylnaphthalene sulfonic acid and its salts dissolved in oil such as mineral seal oil or lubricating oil are important final products as bulk chemical compositions for addition to other oils or motor fuels.

Instead of adding the oil, we may complete the washing and leave any desired part of the solvent in the dinonylnaphthalenes, and thereby produce a suitably fluid product for handling or shipment in drums or cars. Any desired amount of the solvent may be removed by distillation.

The purity and particle size of the aluminum chloride used is of paramount importance in the usual Friedel-Crafts reaction. In the present operation, however, the aluminum chloride catalyst is in solution in a solvent which is substantially water-free and relatively not susceptible to the taking up of moisture from the air. The solvent used (including that recovered from preceding batches) should be as anhydrous as possible. Nitrobenzene alone or a mixture of nitrobenzene and benzene are the preferred solvents and when used should not only be free of water but should also be relatively free from dinitrobenzene, which comes over as a solid with the intermediates.

Naphthalene of the type available in large quantities is apt to contain various amounts of tar acids and tar bases which react irreversibly with aluminum chloride, thus interfering with the reaction and giving a lower yield of product than with purer material. However, we are able to get a nearly equal yield with the present commercial naphthalenes by using aluminum chloride in solution in a suitable solvent and in relatively larger proportions.

The commercially available nonenes are presently obtained as byproducts of the petroleum refining operations and includes small amounts of other olefins and other hydrocarbons. Suitable products containing from 70% to around 90% of nonene produced by polymerization are available from the petroleum refiners. The nonenes which are preferably and advantageously used in our invention are olefins, the major portion of which are tertiary olefins. They may be further characterized as polymers of propylene or propene, especially polymeric tripropylene which is a mixture of isomers having from ⅓ to ½ terminal methyl groups, the double bond being distributed along the chain. Especially effective nonenes are made commercially by the trimerization of propylene by an acid catalyst such as phosphoric acid.

The following table gives the boiling range and other physical properties of two commercially available nonene products which are suitable for use in our invention:

| Cc., I. B. P. | Boiling Range | |
|---|---|---|
| | Product A | Product B |
| I. B. P. | 119 | 133 |
| 1 cc. | 123 | 134.5 |
| 2 cc. | 124 | 135 |
| 4 cc. | 124.5 | 135.5 |
| 6 cc. | 125 | 136 |
| 8 cc. | 125.5 | 136 |
| 10 cc. | 126 | 136 |
| 15 cc. | 127.5 | 136.6 |
| 20 cc. | 128.5 | 137 |
| 30 cc. | 130 | 137.5 |
| 40 cc. | 130.7 | 138 |
| 60 cc. | 133.5 | 139 |
| 80 cc. | 135.8 | 140 |
| 100 cc. | 138.0 | 141 |
| 120 cc. | | 143 |
| 130 cc. | 143 | 144.5 |
| 140 cc. | 147 | 147 |
| 142 cc. | 148 | 148.4 |
| 144 cc. | 149.5 | 150 |
| 145 cc. | 150.5 | 152 |
| 146 cc. | 152 | 153 |
| 147 cc. | 152.5 | 154 |
| 148 cc. | 154 | 155 |
| ND: at 24° C. | 1.4209 | 1.4210 |
| at 20° C. | 1.4211 | 1.4212 |
| Sp. G. at 25° C. | 0.733 | 0.734 |

In the alkylation reaction the reaction of nonene with itself to form the unwanted dimer, or further polymers, may have a rate proportional to the concentration of aluminum chloride and to the square of the concentration of nonene. Accumulation of nonene in the batch during the reaction can arise either from too rapid addition of nonene or from depletion of the catalyst by impurities. This then leads to the formation of dimer with consequent lowering of the yield, and the concentration of active catalyst and of nonene in the bath are therefore of importance during the reaction.

The following is an example of an operation for the production of dinonylnaphthalene according to our invention:

Into a closed 1500 gallon glass lined kettle (or kettle of other suitable material), fitted with agitator and cooling jacket, is charged 4000 lbs. of nitrobenzene. The agitator is started and 200 lbs. of anhydrous aluminum chloride is added, keeping the temperature below 80° F. The aluminum chloride and nitrobenzene are stirred for from 1 to 1½ hours at a temperature between 60° and 80° F. when solution should be substantially complete, and a 10 ml. sample is taken and tested by pyridine titration using malachite green as an indicator. The purpose of this titration is to make sure that there is sufficient AlCl₃ in the batch to keep the reaction going at good rate. Add about 2 ml. of malachite green indicator solution (0.10 g. malachite green oxalate in 100 ml. nitrobenzene) and titrate with 0.20 normal pyridine (15.8 g. pyridine per liter in nitrobenzene). At the end-point, a brilliant green develops which does not change on further addition of pyridine. The sample at this stage should be within the titration limits 13.5–14.5 cc. 1335 pounds of good grade commercial naphthalene is added and mixed with the nitrobenzene and aluminum chloride for one hour and a sample is taken and tested for aluminum chloride content as above. The limits should be between 9.5–10.5 cc. 2800 lbs. of nonene (product B) is added during 10 to 12 hours while keeping the temperature between 80°–90° F. The bromine number during the olefin addition should not be over 2 and the test for aluminum chloride should be 5.3–6.0 cc.

In the foregoing operation, instead of using nitrobenzene, we could have used 2000 lbs. of nitrobenzene and about 2000 lbs. of benzene. This solution gives an advantage in washing in that the solvent layer has a lower specific gravity and results in better stratification.

The batch is now drowned by pumping it into 70 gallons of cold water contained in a suitable vessel such as a lead-lined kettle fitted with an agitator. During the pumping operation, the agitator of the drowning kettle is started and agitation is continued for one hour after the batch has been pumped over.

The batch is allowed to settle for 10 to 20 hours during which time stratification takes place into two distinct layers. The upper layer contains for the most part a solution of dinonylnaphthalene in nitrobenzene or in nitrobenzene and benzene, as the case may be. There is also some unreacted napthalene, nonene, mono-nonylnaphthalene as well as a small amount of olefins and possibly small amounts of other hydrocarbons. The lower layer contains the spent aluminum chloride in aqueous solution and is withdrawn from the upper layer and either discarded or saved for recovery of aluminum chloride.

The upper layer containing dinonylnaphthalene in nitrobenzene is pumped into a solution of 75 lbs. of caustic soda in 100 gallons of water in a vessel fitted with heating coils and an agitator. The temperature is raised during a period of from 1 to 2 hours to 190° F. with continuous agitation which is continued for one hour after this temperature has been reached. The batch is allowed to settle for two hours or more during which time stratification takes place and the lower layer is withdrawn and discarded.

An additional alkaline wash is made using 25 lbs. of caustic soda and 30 gallons of water which is heated to 190° F. as before. After stratification and separating of the lower layer, the nitrobenzene layer is charged to a still and the following distillation fractions were obtained on distillation of a crude charge of 8100 pounds.

| Fraction | Column Temp., °F. | Still Pot Temp., °F. | Vacuum Abs. Press., mm. | Weight, lbs. | Product |
| --- | --- | --- | --- | --- | --- |
| 1 | 190 | 200 | 20 | 100 100 | Water. Light Oil. |
| 2 | 230 | 290 | 12–16 | 3,980 | Nitrobenzene. |
| 3 | 225 | 360 | 3–4 | 125 | Mono-nonyl naphthalene. |

Residue 3950 pounds.

The residue consists for the most part of dinonylnaphthalene and is withdrawn from the still through a coil (which is cooled with water) into the storage tank. This material is used for sulfonation without further purification such as distillation, etc. However, we may purify this material as by distillation where a product of higher purity is required. Fractions 2 and 3 may be recycled to utilize the nitrobenzene and mononylnaphthalene.

The following is an example of an operation for the sulfonation of dinonylnaphthalene according to our invention:

Into a closed steel, jacketed kettle fitted with an agitator is charged 1,000 pounds of a petroleum naphtha or equivalent solvent. The boiling range of an advantageous form of naphtha is between 190° and 220° F. It is important that a solvent be used which has a very low reactivity with sulfuric acid. That is, the solvent must be relatively free of aromatics or olefins which react with sulfuric acid during the sulfonation process. We may use for this purpose such solvents as hexane, heptane or octane, or chlorinated solvents. Such products as those sold under the trade names Sovasol No. 2, Amsco Lactol Spirits and other naphtha products are suitable and effective solvents for both the dinonyl naphthalene and the sulfonic acid.

After charging the naphtha, 1,000 pounds of dinonylnaphthalene as procured in the foregoing operation is added and the agitator is started. The temperature of the solution is adjusted to from 60° to 70° F. and 1,100 pounds of 20% oleum is added over a period of from 4 to 5 hours, keeping the temperature below 70° F. After the acid has been added the batch is warmed to 80° F. and agitated for about one hour.

The batch is now pumped to a suitable settling tank and allowed to settle for around 8 hours during which time stratification takes place and the batch separates into an upper layer and a lower layer. The upper layer is the solvent or oil layer and contains in solution the oil soluble dinonylnaphthalene sulfonic acid, a small amount of di-sulfonic acid and a small amount of sulfuric acid. The lower layer is the spent acid layer and is about 75% sulfuric acid; the remainder is made up of water, SO₂, organic sulfates and other organic degradation products produced during the sulfonation reaction. At this stage in the operation we may modify the operation to follow one of three modifications: (1) We may retain the solvent in the sulfonic acid and proceed with the washing and remove any desired part of the solvent by distillation. We may also add a different volatile solvent. (2) If it is desired to produce a sulfonic acid of general utility, we prefer to incorporate a mineral seal oil in the product. (3) If it is desired to produce a sulfonic acid salt for use as an additive to lubricating oils or motor fuels, we prefer to incorporate a suitable lubricating oil in the product. We shall first describe an operation in which mineral seal oil is used as a solvent for the sulfonic acid. These uses of a solvent or an oil prevent the formation of a viscous product.

The lower layer is withdrawn and the upper solvent layer is pumped into a lead-lined closed kettle containing 170 gallons of water, 900 pounds of mineral seal oil and 40 pounds of 91% isopropanol. The batch is agitated and warmed to 140° F. The agitation is continued for 2 hours after which it is stopped and the batch allowed to settle for one hour. During the settling period, the batch stratifies into 2 distinct layers. The upper layer contains the solvent, the added mineral seal oil, the dinonylnaphthalene sulfonic acid in solution, some disulfonic acid, also some water, a small amount of sulfuric acid and some isopropanol. The lower layer contains for the most part aqueous sulfuric acid, some disulfonic acid and some isopropanol. The lower layer is withdrawn and discarded. The upper layer is allowed to remain in the kettle for the second wash.

In a second wash 170 gallons of water is added and the agitator is started. The batch is warmed to 130°–140° F. and is agitated for a total of 2 hours, after which time it is allowed to settle for one hour. During this period stratification takes place resulting in two distinct layers. The upper layer contains the solvent, the oil soluble sulfonic acid, considerably less of the disulfonic acid than was the case after the first wash and a very small amount of sulfuric acid, some isopropanol and some water. The lower layer contains most of the disulfonic acid in aqueous solution, a little sulfuric acid and some isopropanol. The lower layer is withdrawn and discarded unless it is desirable to recover the disulfonic acid. The upper layer is allowed to remain in the wash kettle and washed for the third time.

In the third wash we add 170 gallons of water and 20 pounds of isopropanol and start agitation while heating to 130°–140 F. After agitation for 2 hours, the batch is allowed to settle for one hour. The batch upon settling will stratify into 2 layers. The upper layer now contains the oil soluble dinonylnaphthalene sulfonic acid practically free from disulfonic acid and sulfuric acid but contains some isopropanol and water. If upon testing, the upper layer is found to contain more sulfuric acid or more disulfonate than is desired, it may be given a fourth wash similar to the third wash. The lower layer contains in aqueous solution disulfonic acid and a very small amount of sulfuric acid and some isopropanol. The lower layer is drawn off and discarded. The upper layer may be transferred to a lead lined vacuum still for the purpose of recovering the solvent naphtha and drying out the water, or it may be neutralized with a suitable base such as soda ash, calcium carbonate or barium hydroxide, ammonium hydroxide or an amine, or zinc oxide, before solvent recovery. If the product is to be used as a rubber plasticizer of one type the neutralization step before subsequent drying is omitted as such plasticizers are preferably solutions of the free sulfonic acid in oil.

To produce a substantially anhydrous dinonylnaphthalene sulfonic acid the washed upper oil layer from the wash kettle is transferred to a lead lined closed kettle fitted with steam coils and a condenser. The temperature of the batch is raised gradually from 215° to 220° F. during which time solvent and water are distilled. After the distillation has practically ceased at atmospheric pressure and practically all of the solvent has been recovered, vacuum is applied over 3 hours to 10 inches absolute keeping the temperature at 215° to 220° F. Near the end of this period, it will be noted that the column temperature will gradually drop to about 150° F. showing that the batch is very low in moisture content at this point— about 1.5–2.2% by analysis. At the end, the batch will have an acid number of 50 to 53 mg. KOH/g.

For purposes of producing another type of rubber plasticizer this sulfonic acid may be further diluted with mineral seal or other oil.

At the stage where the mineral seal oil was added, we may substitute therefor any other suitable oil such as lubricating oil, hydraulic oil, and mixtures of oils used in rust-proofing.

If it had been desired to produce a product for addition to lubricating oils, we would add, for example, a light lubricating oil or an ester type lubricating oil. The oil is added after the sulfuric acid has been so removed and diluted in the previous washing that it does not darken the oil, and is in an amount sufficient to effect the desired increase in the fluidity of the product.

One important function of this oil addition is to decrease the viscosity of the sulfonate which, if the solvent were removed, would be a solid. It is important to use oil in an amount from 30% to 60% of the sulfonic acid on the dry basis so that all of the water and solvent naphtha may be removed by distillation without forming a stiff or solid final product. It is important that the finished sulfonate be handled as a liquid to facilitate shipment in drums or tank cars.

If it is desired to produce one of the inorganic salts such as sodium, calcium or barium of the dinonylnaphthalene sulfonic acid, this is advantageously done after the water washes have been made and the sulfonic acid-containing product is substantially free of sulfuric acid and disulfonic acid. In one modification of the operation the sulfonic acid-containing product may contain about 1 part naphtha, 1.1 parts dinonylnaphthalene sulfonic acid (M. W. 460), solvent oil 30% to 60%, and water.

To produce the inorganic sulfonates, it is advantageous to determine the neutralization equivalent of the sulfonic acid layer and calculate the weight of the metal or amine to be added in forming the salt in the neutralization of the sulfonic acid.

If sodium carbonate, for example, is to be used, it may be dissolved in water or added as a solid. Calcium carbonate and barium carbonate are added as a slurry with water or as a solid to an agitated solution of the sulfonic acid in the solvent.

The following is an example of an operation for the production of the calcium dinonylnaphthalene sulfonate:

Into a suitable closed kettle fitted with a reflux condenser and agitator is charged a solution containing the following:

| | |
|---|---|
| Naphtha | Approximately 1000 pounds. |
| Dinonylnaphthalene sulfonic acid | 1100 pounds (M. W. 460). |
| Oil—A. P. I. viscosity 75 at 100° F | 1000 pounds. |
| Water | 50 pounds. |

The neutralization equivalent is determined and it is found that 119 lbs. 9 ounces of pure calcium carbonate are needed to neutralize the batch.

The batch is heated to 160° F. and the addition of the pure calcium carbonate is started and continued, taking care not to foam the tank over by too rapid addition of the carbonate. During the addition of the last few pounds of the calcium carbonate, the batch is tested with Congo red or other suitable indicator to determine when the neutrality point has been reached. It is very important from a processing standpoint to avoid adding excess carbonate, otherwise a filtration may be necessary to free the finished product from turbidity. When the neutrality point has been reached, the batch is transferred to a still for solvent recovery under atmospheric pressure, and during the recovery of the naphtha, the still pot is gradually heated to 300° F. at which temperature it is found that most of the naphtha has been recovered together with some of the water as a binary distillation mixture. Vacuum is now applied to about 20 to 30 millimeters absolute, maintaining the temperature at 300° F. until distillation practically ceases. The batch or still residue is now withdrawn to a storage tank and tested for percent sulfonate in any suitable analytical procedure. If the percentage of sulfonate is not the standard desired, it may be adjusted by well known procedure to bring it to the required sulfonate concentration. If the percentage of sulfonate is too low, a stronger solution of the sulfonate may be added to bring the batch up to the required concentration.

The material as produced by the neutralization, recovery of the solvent, and drying under vacuum is found to be 51% calcium sulfonate in a solution of lubricating oil which has an A. P. I. viscosity of 75 at 100° F. Analysis shows the material to be substantially free of inorganic salts, water and volatile solvent.

The salts of sodium, potassium, magnesium and barium may be produced in a similar operation.

The zinc salt may be produced, for example, by adding 3 parts by weight of zinc oxide to 42 parts by weight of a 40% solution of dinonylnaphthalene sulfonic acid in mineral seal oil, and heating the mixture to 50 to 60° C. The resulting pasty zinc sulfonate can be used very effectively for the plasticizing of smoked sheet rubber.

The ammonium and amine salts of the sulfonic acids may be produced in a manner similar to that used in the production of the calcium sulfonate. The amine's suitable include aliphatic or aryl primary, secondary or tertiary amines, particularly dimethylamine, ethylenediamine, mono-, di-, and triethylamine, all added to the sulfonic acid as water solutions.

In addition to using the alkali carbonates, the alkali hydroxides or metal hydroxides such as sodium, calcium or barium hydroxide may be used to produce the metal salts. It is frequently desirable to use the hydroxides because of their greater water solubility and absence of foaming during addition to neutralize the batch.

The dinonylnaphthalene sulfonic acid and salts are insoluble in water, soluble in oil, relatively very stable, and can be made to a high order of uniformity and purity. As an example of the stability of the sulfonic acid, the hydrolysis rate is from 20 to 30 times less than the hydrolysis rate of mahogany sulfonic acid.

The salts are relatively highly soluble in oils as compared to the solubility of the salts of the well known mahogany acids. The barium salt, for example, in oils forms a product having exceptional rust inhibiting properties.

This application is a continuation-in-part of our United States patent application Serial No. 224,848, filed May 5, 1951, now abandoned.

We claim:

1. A compound of the group consisting of dinonylnaphthalene sulfonic acid, the nonyl radicals of which are highly branched, and the sodium, potassium, calcium, magnesium, barium, zinc, ammonium and amine salts of said sulfonic acid.

2. A compound according to claim 1 in which the nonyl radicals comprise a tertiary carbon atom.

3. A composition comprising from 0.01% to 60% of a compound of the group consisting of dinonylnaphthalene sulfonic acid, the nonyl radicals of which are highly branched, and the sodium, potassium, calcium, magnesium, barium, zinc, ammonium and amine salts of said sulfonic acid in solution in a petroleum solvent of the group consisting of naphtha, hexane, heptane, octane, mineral seal oil, and lubricating oil.

4. A lubricating oil containing from 0.01% to 10% of a compound of the group consisting of dinonylnaphthalene sulfonic acid, the nonyl radicals of which are highly branched, and the sodium, potassium, calcium, magnesium, barium, zinc, ammonium and amine salts of said sulfonic acid.

5. The process of producing dinonylnaphthalene sulfonic acid which comprises agitating a mixture of dinonylnaphthalene the nonyl radicals of which are highly branched, sulfuric acid and a solvent of the group consisting of naphtha, hexane, heptane and octane, separating by stratification and removal of spent acid a product containing dinonylnaphthalene sulfonic acid in the solvent and incorporating therein a sufficient quantity of oil to decrease the viscosity of the sulfonic acid, and subjecting the solution of dinonylnaphthalene sulfonic acid in oil to washing in water, stratification, and removal of solvent.

6. The process of producing dinonylnaphthalene sulfonic acid which comprises agitating a mixture of dinonylnaphthalene the nonyl radicals of which are highly branched, sulfuric acid and a solvent of the group consisting of naphtha, hexane, heptane and octane, separating by stratification and removal of spent acid a product containing dinonylnaphthalene sulfonic acid in the solvent and subjecting the solution of dinonylnaphthalene sulfonic acid to repeated washings with water with accompanying agitation, and separating by stratification and removal of a water layer the solution of dinonylnaphthalene sulfonic acid after each washing.

7. The process of producing dinonylnaphthalene sulfonic acid which comprises producing dinonylnaphthalene by the alkylation of naphthalene with nonene having a tertiary carbon atom, agitating together the dinonylnaphthalene in a volatile organic inert solvent therefor and concentrated sulfuric acid, separating by stratification the resulting dinonylnaphthalene sulfonic acid from the accompanying liquid including water and residual sulfuric acid, incorporating in the separated dinonylnaphthalene sulfonic acid a sufficient proportion of a hydrocarbon oil to decrease the viscosity and facilitate recovery of the volatile solvent and dinonylnaphthalene sulfonic acid, distilling off the volatile organic solvent, and then effecting a further purification of the dinonylnaphthalene sulfonic acid and hydrocarbon oil by aqueous washing, stratification, and removal of water.

8. In the process of claim 7, subjecting the separated dinonylnaphthalene sulfonic acid to distillation under vacuum, thereby forming a relatively fluid solution of dinonylnaphthalene sulfonic acid in the oil.

9. In the process of claim 6 adding isopropyl alcohol to the wash water to facilitate separation of impurities.

10. The process of forming a metal salt of dinonylnaphthalene sulfonic acid and a metal of the group consisting of sodium, potassium, calcium, magnesium, barium, and zinc which comprises forming a solution of the dinonylnaphthalene sulfonic acid in an inert volatile organic solvent and a hydrocarbon oil, adding to the solution one of the said metals in the form of a compound of the group consisting of hydroxide, oxide and carbonate to form the salt of dinonylnaphthalene sulfonic acid.

11. In the method of claim 10 removing the inert organic volatile solvent by distillation and using such an amount of hydrocarbon oil that it comprises from 30% to 60% of the sulfonate.

References Cited in the file of this patent

UNITED STATES PATENTS

| | | |
|---|---|---|
| 2,256,610 | Buc | Sept. 23, 1941 |
| 2,409,671 | Faust | Oct. 22, 1946 |
| 2,442,915 | Berger | June 8, 1948 |
| 2,463,497 | Smith et al. | Mar. 1, 1949 |

FOREIGN PATENTS

| | | |
|---|---|---|
| 709,587 | Great Britain | May 26, 1954 |

OTHER REFERENCES

Ind. and Eng. Chem., vol. 46, No. 5, page 1035.